United States Patent Office 3,214,394
Patented Oct. 26, 1965

3,214,394
POLYURETHANE FOAM HAVING A PHOSPHONOUS ACID CHEMICALLY COMBINED THEREIN
Blaine O. Schoepfle, Snyder, and Raymond R. Hindersinn, Lewiston, N.Y., and Michael Worsley, Clyde, Alberta, Canada, assignors to Hooker Chemical Corporation, Niagara Falls, N.Y., a corporation of New York
No Drawing. Filed July 17, 1963, Ser. No. 295,829
9 Claims. (Cl. 260—2.5)

This invention relates to compositions for producing fire-resistant foamed or cellular plastic products, and to the products produced thereby. More particularly, the present invention resides in compositions for producing fire-resistant polyurethane foamed or cellular plastic products containing chemically combined therein an acidic phosphorus compound. The invention further resides in the cellular products produced therefrom.

The application is a continuation-in-part of copending application, Serial No. 15,516, filed March 17, 1960.

The rigid plastic foams have found wide and varied use in industry. For instance, they may be used as core materials between skins of many and varied compositions. In aircraft construction the foam may be enclosed between aluminum or fiber glass reinforced plastic skins to form an assembly which is rigid, strong and yet remarkably light. Because of their excellent electrical properties polyurethane foams have also found use in the construction of radomes. The polyurethane foams have another useful property, development of a high degree of adhesion during the foaming process. As a result, they will adhere to skins composed of such varied materials as metals, plastics, ceramics, glass, and the like. The resulting sandwich-type assemblies lend themselves well to use in such diverse fields as the construction and insulation industries. The rigid plastic foams can also be utilized without skins as insulating materials to surround hot water or steam pipes, valves, etc. Their utility for such applications is enhanced by their ability to be applied, foamed, and used in situ.

The prior art teaches that polyurethane foams can be rendered more fire resistant by the incorporation of certain plasticizing substances. Among such plasticizing substances are the various neutral phosphate or phosphonate esters or chlorinated compounds. However, such plasticizing substances are additives which are not chemically combined with the polyurethane plastic and are progressively lost from the plastic by evaporation, leaching, and the like. Consequently, such foams do not have a permanent fire resistance. Furthermore, the plasticizing additive affects the physical properties of the foam, particularly with regard to high temperature strength.

It is therefore an object of the present invention to provide a foamable, polyurethane composition based on polyesters, polyethers, or mixtures thereof, which foamable compositions can be used for the production of cellular plastic materials having a high degree of flame retardance. It is a further object of the present invention to provide such a composition which has a low viscosity at room temperature so that it may be handled by conventional equipment. It is a still further object of the present invention to provide such a composition which attains a high degree of flame retardance while retaining excellent physical properties so desirable in polyurethane foams, such as good water resistance, good high temperature strength, and a minimum amount of foam shrinkage. Further objects and advantages of the present invention will appear hereinafter.

In accordance with the present invention, it has been found that fire resistant polyurethane foams having excellent physical properties can be produced by utilizing a foamable composition which comprises the reaction product of (1) a hydroxyl-containing polymer having a hydroxyl number of between about twenty-five and nine hundred, (2) an organic polyisocyanate, and (3) a phosphonous acid.

The present invention can be used to obtain rigid, semi-rigid or flexible polyurethane foams, although the rigid foams are preferred due largely to the greater need in rigid foams for thermal stability, low viscosity reactants, and fire-resistance.

Various hydroxyl-containing polymers having a hydroxyl number of between about twenty-five and nine hundred can be used in the present invention, for example, a polyester, a polyether or mixtures thereof. The preferred hydroxyl-containing polymers of the present invention are the polyester-polyether mixtures wherein the polyester portion comprises fifty percent or more of the polyester-polyether mixture (i.e., when the polyester-polyether mixture is at least fifty percent by weight polyester). Excellent results are obtainable when less than fifty percent polyester is employed but supplementary additives may be desirable to render such a foam self-extinguishing. It is especially preferred in the present invention to use a mixed polyester-polyether in the ratio of fifty-five to seventy-five parts polyester to fifteen to thirty-five parts polyether. It has been found that this particularly preferred range utilizes to best advantage the low cost of the polyethers, the low viscosity of the polyethers, and the desirable properties of the polyesters. Generally, the hydroxyl-containing polymers of the present invention have a molecular weight of from about 200 to about 4,000.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. Among the polycarboxylic compounds which may be used to form the polyester are: maleic acid; fumaric acid; phthalic acid; tetrachlorophthalic acid; and aliphatic acids such as oxalic, malonic, succinic, glutaric, adipic, and the like. Additional polycarboxylic compounds which may be used to form the polyester are Diels-Alder adducts of hexahalocyclopentadiene and a polycarboxylic compound, wherein the halogen is selected from the group consisting of chlorine, bromine, fluorine and mixtures thereof, for example: 1,4,5,6,7,7-hexachlorobicyclo-(2.2.1) - 5 - heptene-2,3-dicarboxylic acid; 1,4,5,6 - tetrachloro-7,7-difluorobicyclo-(2.2.1) - 5 - heptene-2,3-dicarboxylic acid; 1,4,5,6,7,7-hexabromobicyclo-(2.2.1) - 5-heptene - 2,3 - dicarboxylic acid; 1,4,5,6-tetrabromo-7,7-difluorobicyclo-(2.2.1)-5-heptene-2,3 - dicarboxylic acid; etc. Mixtures of any of the above polycarboxylic compounds may be employed.

To obtain a satisfactory rigid foam, at least a portion of the total polyhydric alcohol component should be a polyhydric alcohol containing at least three hydroxyl groups. This provides a means for branching the polyester. Where an even more rigid structure is desired, the whole alcohol component may be made up of a trifunctional alcohol such as glycerol. Where a less rigid final product is desired, a difunctional polyhydric alcohol such as ethylene glycol or 1,4-butanediol may be utilized as that part of the polyhydric alcohol component. Other glycols such as diethylene glycol, propylene glycol, and the like, can also be used. Among the polyhydric alcohols which can be used are glycerol, hexanetriol, butanetriol, trimethylol propane, trimethylol ethane, pentaerythritol, and the like. The ratio of the polyhydric alcohol such as glycerol to the polybasic acid may be expressed as the hydroxyl-carboxyl ratio, which may be defined as the number of moles of hydroxyl groups to the number of moles of carboxyl groups in a given weight of resin. This ratio may be varied over a wide range. Generally, however, a hydroxyl-carboxyl ratio of between 1.5:1 to 5:1 is employed.

Instead of employing a polycarboxylic compound which is a Diels-Alder adduct of hexahalocyclopentadiene and a polycarboxylic compound, we may employ a polyhydric alcohol which is a Diels-Alder adduct of hexahalocyclopentadiene and a polyhydric alcohol. This can be done by employing (A) a polyester resin comprised of the reaction product of (1) an adduct of hexahalocyclopentadiene and a polyhydric alcohol containing aliphatic carbon-to-carbon unsaturation, (2) a polycarboxylic compound, and (3) a polyhydric alcohol containing at least three hydroxyl groups. Typical adducts include: 2,3-dimethylol - 1,4,5,6,7,7 - hexachlorobicyclo-(2.2.1)-5-heptene; 2,3 - dimethylol-1,4,5,6-tetrachloro-7,7-difluorobicyclo-(2.2.1)-5-heptene, etc. These compounds and others are disclosed in U.S. Patent No. 3,007,958.

Where aromatic or bicyclo carboxylic compounds are used, it is often desirable to incorporate aliphatic acids as part of the polyester resin. Suitable acids are adipic, oxalic, malonic, succinic, suberic, azelaic, and the like. Unsaturated acids such as maleic, fumaric, itaconic, citraconic, aconitic, and the like, can also be used.

The preferred polyesters of the present invention are those which contain an adduct of hexahalocyclopentadiene co-reacted in the polyester portion in view of the fact that they contain a large amount of stable chlorine, thereby enhancing the flame-retardant characteristics of the resultant foam. Particularly preferred are those polyesters wherein the adduct is reacted in the polycarboxylic portion of the polyester, due to lower cost, commercial availability and utility of the polycarboxylic adducts of hexahalocyclopentadiene.

The polyethers employed are the reaction products of (1) a polyhydric alcohol, a polycarboxylic acid, and (2) a monomeric 1,2-epoxide possessing a single 1,2-epoxy group, such as, for example, propylene oxide. The polyhydric alcohols and polycarboxylic acids which may be employed are any of the polyhydric alcohols and polycarboxylic acids hereinbefore listed. Examples of monomeric 1,2-epoxides include ethylene oxide, propylene oxide, butylene oxide, isobutylene oxide, 2,3-epoxyhexane, epichlorohydrin, styrene oxide, glycidyl ether, glycidyl methyl sulfone, glycidyl methacrylate, glycidyl benzoate, glycidyl sorbate, glycidyl allyl phthalate, and the like. The preferred monoepoxides are the monoepoxide-substituted hydrocarbons, the monoepoxy-substituted ethers, sulfides, sulfones and esters wherein the said compounds contain no more than eighteen carbon atoms. A lower alkylene oxide is preferably employed in rigid foams as the higher counterparts yield flexible rather than rigid products.

A large number of various organic diisocyanates can be used. The aromatic diisocyanates are more reactive and less toxic than the aliphatic members, and are consequently preferred. The compounds which are at present most readily available commercially are 2,4-tolylene diisocyanate, 2,6-tolylene diisocyanate and mixtures thereof. However, others may be used, among them methylene bis (4-phenylisocyanate), 3,3'-bitolylene-4,4'-diisocyanate, 3, 3'-dimethoxy-4,4'-biphenylene diisocyanate, naphthalene-1,5-diisocyanate, 1,3,5-benzene triisocyanate, polymethylene polyphenylisocyanate, as well as the many impure or crude polyisocyanates that are commercially available, such as crude mixtures of methylene bis (4-phenylisocyanate).

The diisocyanate concentration can be varied from about seventy-five to one hundred and twenty-five percent of isocyanato groups with respect to the total number of hydroxyl and carboxyl groups in the hydroxyl-containing polymer and foaming agent (if a foaming agent is employed). The preferred concentration is about one hundred percent.

Any foaming agent commonly used in the art can be employed. Suitable foaming agents are those materials capable of liberating gaseous products when heated, or when reacted with an isocyanate. The preferred foaming agents are the fluorochlorocarbons boiling in the range of twenty to fifty degrees centigrade, and mixtures thereof, for example trichlorofluoromethane, trichlorotrifluoroethane, dichloromonofluoromethane, monochloroethane, monochloromonofluoroethane, difluoromonochloroethane and difluorodichloroethane.

Anther foaming system which can be used is that comprised of tertiary alcohols in the presence of strong, concentrated acid catalysts such as is disclosed and claimed in U.S. Patent No. 2,865,869. Examples of tertiary alcohols include: tertiary amyl alcohol; tertiary butyl alcohol; and the like. Examples of catalysts include: sulfuric acid; phosphoric acid; sulfonic acid; and aluminum chloride, etc. In addition, various secondary alcohols can be used such as: 1-phenyl-1,2-ethanediol; 2-butanol; and 2-methyl-2,4-pentanediol; and the like, preferably with strong, concentrated acid catalysts as above. Other foaming agents that can be used include the following: polycarboxylic acids; polycarboxylic acid anhydrides; dimethylol ureas; polymethyl phenols; formic acid and tetrahydroxymethylphosphonium chloride. In addition, mixtures of the above foaming agents may be employed.

The phosphorus compounds of the present invention are the phosphonous acids. Typical phosphonous acids that can be used have the formula:

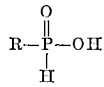

wherein R may be alkyl, aryl, or aralkyl, for example, methylphosphonous acid, ethylphosphonous acid, propylphosphonous acid, butylphosphonous acid, phenylphosphonous acid, naphthylphosphonous acid, tolylphosphonous acid, xylylphosphonous acid, and benzylphosphonous acid. The alkyl group preferably contains up to six carbon atoms, and the aryl and aralkyl group preferably contain up to ten carbon atoms to avoid dilution of the phosphorus content. The phosphorus compounds of the present invention are employed in amounts from about five to thirty percent by weight based upon the weight of the hydroxyl-containing polymer. The preferred amount is from about eight to about fifteen percent by weight.

The conditions of the procedure for preparing the compositions of the present invention may be varied within wide limits. It is preferred to add the phosphorus compound directly to the hydroxyl-containing polymer, so as to reduce the viscosity, and subsequently add the isocyanate component and foaming agent; however, excellent results are obtainable when all the components are simultaneously mixed together, or when the phosphorus compound or compounds is prereacted with the isocyanate component.

Various additives may be incorporated which serve to provide different properties. For instance, antimony oxide may be used to improve fire-resistance, fillers, such as clay, calcium sulfate or ammonium phosphate may be added to lower cost, and improve density and fire-resistance; ingredients such as dyes may be added for color, and fibrous glass, asbestos, or synthetic fibers may be added for strength.

The following examples serve to illustrate the present invention and the improvements resulting therefrom, but do not limit it. All parts are by weight and temperatures in degrees centigrade unless specified otherwise.

*Example 1*

(A) A resin was prepared by blending the following ingredients: (1) sixty-five parts by weight of the reaction product of two moles of trimethylolpropane and one mole of 1,4,5,6,7,7-hexachlorobicyclo-(2.2.1)-5-heptene-2,3-dicarboxylic acid condensed to an acid number of below ten and having a hydroxyl number of 365; (2) twenty-five parts by weight of the reaction product of one mole of trimethylolpropane and six moles of propylene oxide having a hydroxyl number of 392, and (3) ten parts by weight of benzene phosphonous acid.

(B) To 200 grams of the resin prepared in Example 1 (A) at 50 degrees centigrade was added a solution of (1) sixty grams of trichlorofluoromethane, and (2) 184 grams of polymethylene polyphenylisocyanate. The mixture was stirred rapidly for thirty seconds, and poured into a mold. The resultant foam was cured for ten minutes at 80 degrees centigrade, to provide a foam having a density of 1.41 pounds per cubic foot, and a burning rate of 0.34 inch per minute by the ASTM D-757-49 test.

*Example 2*

The procedure of Example 1 was repeated except that no phosphorus compound was included in the composition. The resulting foam had a density of 2.24 pounds per cubic foot, and a burning rate of 11.7 inches per minute by the ASTM D-757-49 test.

*Example 3*

Results comparable to those obtained in Example 1 are obtained when the procedure of Example 1 is repeated except that the phosphorus compound is methylphosphonous acid, and the polyisocyanate is a prepolymer prepared by reacting 593 grams of 1,4,5,6,6,7,7-hexachlorobicyclo-(2.2.1)-5-heptene-2,3-dicarboxylic acid, and 1,392 grams of a commercial mixture of 80 percent 2,4-tolylene diisocyanate and 20 percent 2,6-tolylene diisocyanate at 80 to 120 degrees centigrade.

*Example 4*

A resin was prepared by blending the following components: (1) 85 parts by weight of a polyester derived from 8.8 moles of trimethylolpropane, five moles of adipic acid and one mole of phthalic anhydride condensed to an acid number of less than one and having a hydroxyl number of 435; and (2) fifteen parts of tris-(β-chloroethyl) phosphate. To 200 grams of this resin at forty-five degrees centigrade was added a solution of sixty grams of trichlorofluoromethane and two hundred grams of the reaction product prepared in a manner after Example 1 (B) from twenty parts of the above polyester and eighty parts of a commercial mixture of eighty percent 2,4-tolylene diisocyanate and twenty percent 2,6-tolylene diisocyanate. The mixture was stirred rapidly for thirty seconds, then poured into a mold. The foam was cured for fifteen minutes at 75 degrees centigrade. Attempts to achieve a burning rate of less than 0.5 inch per minute led to swelling of over one hundred percent in humidity ageing and dry heat ageing.

*Example 5*

Example 4 was repeated, with the exception that tricresyl phosphate was utilized instead of tris-(β-chloroethyl) phosphate. Attempts to achieve a burning rate of less than 0.5 inch per minute led to swelling of over one hundred percent in humidity ageing and dry heat ageing.

It should be understood that the present invention also contemplates the polyphosphorus acids.

When an adduct of hexahalocyclopentadiene is employed, the particle sizes of the hexahalocyclopentadiene adduct should preferably be of ten mesh or smaller, that is have a particle size of 1.68 millimeters or smaller, in order to avoid gel particles. In the foregoing examples, the hexahalocyclopentadiene adducts employed had a particle size of ten mesh or smaller.

This invention can be embodied in other forms or carried out in other ways without departing from the spirit or essential characteristics thereof. The present embodiment is therefore to be considered as in all respects, illustrative, and not restrictive, and all changes which come within the meaning and range of equivalency of the claims are intended to be embraced.

We claim:

1. A polyurethane foam having a phosphonous acid chemically combined therein.

2. A fire-resistant cellular reaction product comprising the reaction product of (1) a hydroxyl-containing polymer having a hydroxyl number of between about twenty-five and nine hundred, (2) an organic diisocyanate, and (3) a phosphonous acid.

3. A fire-resistant cellular reaction product comprising the reaction product of (1) a hydroxyl-containing polymer having a hydroxyl number of between about twenty-five and nine hundred selected from the group consisting of a polyester, a polyether and mixtures thereof, (2) an organic diisocyanate, (3) a phosphonous acid, and (4) a foaming agent.

4. A fire-resistant cellular reaction product according to claim 3 wherein the phosphonic acid is benzene phosphonous acid.

5. A fire-resistant cellular reaction product according to claim 3, wherein said hydroxyl-containing polymer is a polyester comprising the reaction product of a polyhydric alcohol and a polycarboxylic compound.

6. A fire-resistant cellular reaction product according to claim 3 wherein said hydroxyl-containing polymer is a mixture of a polyester and a polyether containing at least fifty percent by weight of polyester, said polyester comprising the reaction product of a polyhydric alcohol and a polycarboxylic compound, and said polyether comprising the reaction product of a monomeric 1,2-epoxide and a material selected from the group consisting of a polyhydric alcohol and a polycarboxylic acid.

7. A fire-resistant cellular reaction product according to claim 6 wherein the polycarboxylic acid portion of said polyester contains an adduct of hexahalocyclopentadiene and a polycarboxylic acid, wherein the halogen is selected from the group consisting of chlorine, bromine, fluorine and mixtures thereof.

8. A fire-resistant cellular reaction product according to claim 7 wherein the adduct of hexahalocyclopentadiene is 1,4,5,6,7,7 - hexachlorobicyclo-(2.2.1)-5-heptene-2,3-dicarboxylic acid.

No references cited.

LEON J. BERCOVITZ, *Primary Examiner.*